United States Patent
Krkljus et al.

(10) Patent No.: US 10,283,761 B2
(45) Date of Patent: May 7, 2019

(54) ELECTRODE MATERIALS, THEIR MANUFACTURE AND USE

(71) Applicant: BASF SE, Ludwigshafen (DE)

(72) Inventors: Ivana Krkljus, Ludwigshafen (DE); Aleksei Volkov, Ludwigshafen (DE); Carsten Sueling, Frankenthal (DE)

(73) Assignee: BASF SE, Ludwigshafen (DE)

( * ) Notice: Subject to any disclaimer, the term of this patent is extended or adjusted under 35 U.S.C. 154(b) by 68 days.

(21) Appl. No.: 15/524,400

(22) PCT Filed: Nov. 2, 2015

(86) PCT No.: PCT/EP2015/075399
§ 371 (c)(1),
(2) Date: May 4, 2017

(87) PCT Pub. No.: WO2016/074960
PCT Pub. Date: May 19, 2016

(65) Prior Publication Data
US 2018/0287154 A1    Oct. 4, 2018

(30) Foreign Application Priority Data
Nov. 13, 2014   (EP) .................................. 14193022

(51) Int. Cl.
| | |
|---|---|
| H01M 4/36 | (2006.01) |
| H01M 4/58 | (2010.01) |
| H01M 10/0525 | (2010.01) |
| H01M 2/16 | (2006.01) |
| H01M 4/62 | (2006.01) |
| H01M 10/0569 | (2010.01) |
| H01M 4/02 | (2006.01) |

(52) U.S. Cl.
CPC .......... *H01M 4/364* (2013.01); *H01M 2/164* (2013.01); *H01M 4/5825* (2013.01); *H01M 4/623* (2013.01); *H01M 4/625* (2013.01); *H01M 10/0525* (2013.01); *H01M 10/0569* (2013.01); *H01M 2004/021* (2013.01); *Y02T 10/7011* (2013.01)

(58) Field of Classification Search
CPC ...... H01M 4/364; H01M 4/625; H01M 4/623; H01M 4/5825; H01M 10/0525; H01M 10/0569

USPC ........................................................ 429/221
See application file for complete search history.

(56) References Cited

U.S. PATENT DOCUMENTS

| | | | |
|---|---|---|---|
| 9,214,700 B2 * | 12/2015 | Noh .................... | H01M 4/5825 |
| 2007/0059602 A1 | 3/2007 | Morishima et al. | |
| 2011/0027651 A1 | 2/2011 | Sun et al. | |
| 2012/0021291 A1 | 1/2012 | Ji et al. | |
| 2012/0231334 A1 * | 9/2012 | Kinoshita .............. | B82Y 30/00 |
| | | | 429/211 |
| 2013/0183579 A1 * | 7/2013 | Kim ...................... | H01M 4/131 |
| | | | 429/206 |
| 2015/0118560 A1 | 4/2015 | Ewald et al. | |
| 2016/0233488 A1 * | 8/2016 | Krkljus ................. | H01M 4/131 |

FOREIGN PATENT DOCUMENTS

| | | |
|---|---|---|
| EP | 2 665 114 A1 | 11/2013 |
| WO | 2010/112977 A1 | 10/2010 |

OTHER PUBLICATIONS

Extended European Search Report dated Apr. 21, 2015 in Patent Application No. 14193022.2.
International Search Report and Written Opinion dated Mar. 15, 2016 in PCT/EP2015/075399.
B.J. Ingram, et al., "Powder-Solution-Composite Technique for Measuring Electrical Conductivity of Ceramic Powders", Journal of Electrochemical Society, vol. 150, 2003, pp. E396-E402.
U.S. Appl. No. 14/770,147, filed Aug. 25, 2015, US 2016-0006023 A1, Ivana Krkljus.
U.S. Appl. No. 15/023,046, filed Mar. 18, 2016, US 2016-0233488 A1, Ivana Krkljus.
Do-Kyun Kim et al., "Effect of synthesis conditions on the properties of LiFePO$_4$ for secondary lithium batteries", Journal of Power Sources, 2006, vol. 159, pp. 237-240, XP027937931.

* cited by examiner

*Primary Examiner* — Amanda C. Walke
(74) *Attorney, Agent, or Firm* — Oblon, McClelland, Maier & Neustadt, L.L.P.

(57) ABSTRACT

Electrode material comprising (a) at least one compound of general formula (I) LiFe$_{(1-y)}$M$^1_y$PO$_4$ (I) y is in the range of from zero to 0.4 M$^1$ is at least one element selected from Co, Mn, Ni, V, Mg, Nd, Zn and Y, that contains at least one further iron-phosphorous compound, and in the range of from 0.05 to 0.25% by weight of sulphur and in the range of from 0.003 to 0.5% by weight of Ti, (b) carbon in electrically conductive modification.

12 Claims, No Drawings

ELECTRODE MATERIALS, THEIR MANUFACTURE AND USE

The present invention is directed towards an electrode material comprising
(a) cathode active material comprising at least one compound of general formula (I)

y is in the range of from zero to 0.4
$M^1$ is at least one element selected from Co, Mn, Ni, V, Mg, Nd, Zn and Y,
and at least one further iron-phosphorous compound with a composition different from compound of general formula (I)
and in the range of from 0.05 to 0.25% by weight of sulphur and in the range of from 0.003 to 0.5% by weight of Ti,
(b) carbon in electrically conductive modification.

Furthermore, the present invention is directed towards a method for making inventive electrode materials. Furthermore, the present invention is directed towards the use of inventive electrode materials.

Lithium ion secondary batteries are modern devices for storing energy. Many application fields have been and are contemplated, from small devices such as mobile phones and laptop computers through car batteries and other batteries for electromobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium cobalt oxides, and lithium nickel cobalt manganese oxides. Although extensive research has been performed the solutions found so far still leave room for improvement.

Various authors have studied the influence of the stoichiometry of lithium and transition metals in lithium iron phosphate. D.-H. Kim et al., *J. Power Sources* 2006, 159, 237 have reported on impurities of lithium phosphate in lithium iron phosphate, and they disclose that samples with excess iron have more capacity and better rate capability. In US 2007/059602 materials have been disclosed that comprise at least one lithiated transition metal oxide and $FePO_4$.

However, the materials disclosed above still leave room for improvement. In particular, in many cases the charge and discharge behaviour is not good enough. Although lithium iron phosphate does not contain environmentally dangerous transition metals lithium iron phosphate has downsides like the low electrical conductivity. For high-performance electrochemical cells, comparably high amounts of conductive carbon need to be added. However, conductive carbon does not make positive contributions to volumetric energy density or higher efficiency in terms of energy delivery. In particular, conductive carbon does not contribute to properties like capacity, cycle stability, energy and the like of electrochemical cells.

It was therefore an objective of the present invention to provide cells and batteries with an improved charging and discharging behaviour and that are particularly useful for so-called power applications. It was furthermore an objective to provide a process for making cells and batteries with an improved charging and discharging speed.

Accordingly, the materials defined at the outset have been found, hereinafter also being referred to as inventive electrode materials or electrode materials according to the invention.

Inventive electrode materials comprise at least two components, components (a) and (b). Component (a) is also being referred to as cathode active material. Said components will be described in more detail below.

Component (a) contains at least one cathode active material that is characterized by the general formula (I)

wherein
y is in the range of from zero to 0.8, preferably zero to 0.2,
$M^1$ is at least one element selected from Co, Mn, Ni, V, Mg, Nd, Zn and Y, and in embodiments in which y≠zero, $M^1$ being selected from Co and Mn is preferred.

Component (a) contains at least one further iron-phosphorous compound, in form of a solid solution in compound of general formula (I) or in domains. For example, such further iron-phosphorus compound may be distributed unevenly within compound (a), for example in the grain boundaries. In other embodiments, said further iron-phosphorous compound is located in compound of general formula (I) in form of a solid solution. Said further iron-phosphorous compound has a composition different from compound (I).

Said further iron-phosphorous compound may be selected from iron phosphates, iron phosphites and iron phosphides. Preferred are iron phosphate such as $FePO_4$ and iron phosphide of formula $Fe_2P$.

In a preferred embodiment, said further iron-phosphorous compound is selected from $FePO_4$, $Li_3Fe_2(PO_4)_3$, $Fe_3(PO_4)_2$ and $Fe_2P_2O_7$ and even more preferably selected from $Fe_3(PO_4)_2$ and $Fe_2P_2O_7$.

In a solid solution, no phase boundaries can be detected, and the two or more compounds are dispersed evenly through the respective material.

In one embodiment of the present invention, said further iron-phosphorous compound amounts to 0.01 to 10% by weight, referring to compound of general formula (I), preferably up to 5% by weight.

Compound (a) may further contain impurities such as $Fe_2O_3$.

Domains may have regular or irregular shape, and they may have an average diameter in the range of from 0.1 to 1 μm.

Component (a) further contains in the range of from 0.05 to 0.25% by weight, preferably 0.07 to 0.25% by weight of sulphur and in the range of from 0.003 to 0.5%, preferably 0.01 to 0.25% by weight of titanium. Said percentages refer to component (a).

Preferably, sulphur is contained as sulphide or sulphate or combinations of sulphate and sulphide. It is also possible that some sulphur is contained as sulphite, $SO_3^{2-}$. Preferably, sulphur is essentially contained as sulphate, for example, at least more than 66 mole-% of the sulphur is contained as sulphate.

Preferably, Ti is contained as Ti(+IV), preferably in the form of $TiO_2$ or titanium phosphate. Preferably, the majority or even essentially all Ti is incorporated into the olivine structure of $LiFe_{(1-y)}M^1_yPO_4$, especially into the crystal site of the Fe(+II).

The sulphur content is determined as S and it can be measured by, e.g. elemental analysis. The Ti content can be measured, e.g., by optical emission spectrometry with inductively coupled plasma, wavelength: 334.941 nm.

Without wishing to be bound by any theory it is supposed that some sulphur is preferably introduced as sulphide in the olivine crystal lattice.

In one embodiment of the present invention, component (a) contains in the range of from 50 to 200 ppm of at least one metal selected from Cu, Ca, Mg, Zn, and Ni.

In one embodiment of the present invention, component (a) contains in the range of from 50 to 200 ppm of each Cu, Ca, Mg, Zn, and Ni.

In one embodiment of the present invention, component (a) contains from 0.1 to 2% by weight of at least one transition metal selected from the group consisting of Mo, Cr and Ni.

Component (a) can be manufactured according to various methods, for example by solid state methods or by precipitation methods. In one embodiment, component (a) can be synthesized starting from a water-insoluble iron compound as source of iron. In such an embodiment, an aqueous slurry of a water-insoluble iron(III) compound such as $Fe_2O_3$, $Fe_3O_4$, FeOOH, or $Fe(OH)_3$ is mixed with at least one reducing agent such as hydrazine, hydrazine hydrate, hydrazine sulphate, hydroxyl amine, a carbon-based reducing agent such as a primary or secondary alcohol, a reducing sugar, or ascorbic acid, or a reductive phosphorous compound such as $H_3PO_3$ or an ammonium salt thereof, is being prepared. A carbon source such as graphite, soot or active carbon can be added. In case the reducing agent does not bear any phosphorous atom a phosphate source is added, such as phosphoric acid, ammonium phosphate or ammonium (di)hydrogen phosphate, especially $(NH_4)_2HPO_4$ or $NH_4H_2PO_4$. Combinations of $H_3PO_3$ or an ammonium salt thereof and a phosphate source are feasible as well. The slurry so obtained is then reacted at a temperature in the range of from 100 to 350° C. in the presence of a lithium compound such as $Li_2CO_3$, LiOH or the like, preferably for a period of time in the range of from 1 to 24 hours. The reaction can be performed at a pressure in the range of from 1 to 100 bar. The water is then removed, followed by calcination, for example at 700 to 900° C., preferably under an atmosphere of hydrogen.

In another embodiment, component (a) can be synthesized from blends of iron phosphate, without or preferably with water of crystallization, and a lithium salt, preferably $Li_2CO_3$, by a solid state reaction in the range of from 650 to 800° C.

In each of the above embodiments, a molar excess of iron compound or the sum of iron and $M^1$, respectively, with respect to lithium compound(s) will be applied.

In formulae of the above compounds, water of crystallization has been neglected.

Water-soluble in the context of starting materials for the synthesis of component (a) refers to compounds that exhibit a solubility of 10 g/l or more in distilled water at 20° C. Water-insoluble in the context of starting materials for the synthesis of component (a) refers to compounds that exhibit a solubility of 0.1 g/l or less in distilled water at 20° C.

Sulphur and titanium can be introduced, e. g., by adding the desired amounts of titanium compound and sulphide to the reaction mixture according to any of the preceding methods. It is preferred, though, so select a so-called sulphur-rich and titanium-rich iron source for manufacturing component (a). It is particularly preferred to use a water-insoluble iron source such as a sulphur-rich and titanium-rich FeOOH and to reduce it with at least one reducing agent such as hydrazine, hydrazine hydrate, hydrazine sulphate, hydroxyl amine, a carbon-based reducing agent such as a primary or secondary alcohol, a reducing sugar, or ascorbic acid, or a reductive phosphorous compound such as $H_3PO_3$ or an ammonium salt thereof, preferably in the presence of phosphate. Phosphate can be introduced as phosphoric acid, or ammonium phosphate.

In one embodiment of the present invention, sulphur-rich iron sources contain in the range of from 0.1 to 0.5% by weight of sulphur, preferably 0.25 to 0.5% by weight, referring to the respective iron source, preferably sulphur-rich FeOOH.

In one embodiment of the present invention, Ti-rich iron sources contain in the range of from 0.02 to 1% by weight of Ti, referring to the respective iron source, preferably 0.003 to 0.2% by weight.

Electrode materials according to the present invention further contain carbon in electrically conductive modification, in brief also referred to as carbon (b). Carbon (b) can be selected from soot, active carbon, carbon nanotubes, graphene, and graphite. Carbon (b) can be added as such during preparation of electrode materials according to the invention, or it can be manufactured in situ together with component (a), for example by adding an organic compound and calcining any precursor of component (a) together with said organic compound. Polymeric organic compound are preferred examples of organic compounds that may serve as a carbon source.

In one embodiment of the present invention, the amount of carbon (b) is in the range of 0.1 to 5% by weight, referring to component (a), preferably at least 0.5% by weight.

In one embodiment of the present invention, the surface (BET) of component (a) is in the range of from 5 to 35 $m^2/g$, preferably 7 to 15 $m^2/g$.

In one embodiment of the present invention, primary particles of component (a) have an average diameter in the range from 1 to 2000 nm, preferably from 10 to 1000 nm, particularly preferably from 50 to 500 nm, even more preferably 100 to 270 nm. The average primary particle diameter can, for example, be determined by SEM or TEM, or by XRD methods. Such XRD methods preferably use the Scherrer Equation where the peak width is inversely proportional to crystallite size.

In one embodiment of the present invention, component (a) is in the form of agglomerates of primary particles, such agglomerates having an average diameter (d50) in the range of from 1 μm to 10 μm, preferably 2 to 5 μm, even more preferably 4 to 5 μm.

In one embodiment of the present invention, component (a) is coated by a layer of carbon (b) between the primary crystallites (primary particles), and/or on the surface of the secondary particles.

In an embodiment of the present invention, carbon (b) has an average primary particle diameter in the range from 1 to 500 nm, preferably in the range from 2 to 100 nm, particularly preferably in the range from 2 to 50 nm, very particularly preferably in the range from 2 to 4 nm or less.

The materials according to the present invention may in particular serve as cathode materials.

A further aspect of the present invention refers to cathodes comprising at least one electrode material according to the present invention. They are particularly useful for lithium ion batteries. Lithium ion batteries comprising at least one electrode according to the present invention exhibit a good or even better conductivity than many other LFP-based materials with identical carbon sontent. Said good or even better conductivity may lead to a very good charge and discharge behavior, for example faster charging duration and improved rate capacity. Therefore, inventive cathodes are extremely well suitable for power applications such as e-bike batteries, e-busses, scooters, HEVs, stationary applications, energy storage systems (ESS) such as, but not limited to solar and wind power storage systems, furthermore backup power systems, marine applications, telecommunication, 12V starter batteries, for example start-stop technologies and micro hybrid technologies, and power tools such as battery-driven drills.

Preferably, also the cycle stability and the C-rate capacity behavior are improved, or they are at least identical although the Li content is lower. Cathodes comprising at least one electrode material according to the present invention are hereinafter also referred to as inventive cathodes or cathodes according to the present invention.

Cathodes according to the present invention can comprise further components. They can comprise a current collector, such as, but not limited to, an aluminum foil. They can further comprise a binder (c).

Suitable binders (c) are preferably selected from organic (co)polymers. Suitable (co)polymers, i.e. homopolymers or copolymers, can be selected, for example, from (co)polymers obtainable by anionic, catalytic or free-radical (co)polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol % of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth)acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol % of copolymerized propylene and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder (c) is polybutadiene.

Other suitable binders (c) are selected from polyethylene oxide (PEO), cellulose, carboxymethylcellulose, polyimides and polyvinyl alcohol.

In one embodiment of the present invention, binder (c) is selected from those (co)polymers which have an average molecular weight $M_w$ in the range from 50,000 to 1,000,000 g/mol, preferably to 500,000 g/mol.

Binder (c) may be cross-linked or non-cross-linked (co)polymers.

In a particularly preferred embodiment of the present invention, binder (c) is selected from halogenated (co)polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders (c) are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive cathodes may comprise 1 to 15% by weight of binder(s) (d), referring to the sum of component (a) and carbon (b). In other embodiments, inventive cathodes may comprise 0.1 up to less than 1% by weight of binder(s) (d).

A further aspect of the present invention is a battery, containing (A) at least one cathode comprising component (a), carbon (b), and binder (c)

(B) at least one anode, and (C) at least one electrolyte.

Embodiments of cathode (A) have been described above in detail.

Anode (B) may contain at least one anode active material, such as carbon (graphite), $TiO_2$, lithium titanium oxide, silicon or tin. Anode (B) may additionally contain a current collector, for example a metal foil such as a copper foil.

Electrolyte (C) may comprise at least one non-aqueous solvent, at least one electrolyte salt and, optionally, one or more additives.

Nonaqueous solvents for electrolyte (C) can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol % of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5 000 000 g/mol, preferably up to 2 000 000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds of the general formulae (III) and (IV)

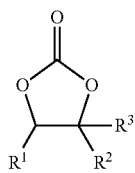

(III)

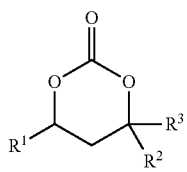

(IV)

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (V).

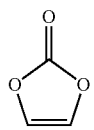

(V)

The solvent or solvents is/are preferably used in the water-free state, i.e. with a water content in the range from 1 ppm to 0.1% by weight, which can be determined, for example, by Karl-Fischer titration.

Electrolyte (C) further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:

t=1, when Y is selected from among oxygen and sulfur,
t=2, when Y is selected from among nitrogen and phosphorus, and
t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

In an embodiment of the present invention, batteries according to the invention comprise one or more separators by means of which the electrodes are mechanically separated. Suitable separators are polymer films, in particular porous polymer films, which are unreactive toward metallic lithium. Particularly suitable materials for separators are polyolefins, in particular film-forming porous polyethylene and film-forming porous polypropylene.

Separators composed of polyolefin, in particular polyethylene or polypropylene, may exhibit a porosity in the range from 35 to 45%. Suitable pore diameters are, for example, in the range from 30 to 500 nm.

In another embodiment of the present invention, separators can be selected from among PET nonwovens filled with inorganic particles. Such separators can have porosities in the range from 40 to 55%. Suitable pore diameters are, for example, in the range from 80 to 750 nm.

Batteries according to the invention further comprise a housing which can have any shape, for example cuboidal or the shape of a cylindrical disk or a cylindrical can. In one variant, a metal foil configured as a pouch is used as housing.

Batteries according to the invention display a good charge and discharge behavior, for example faster charging duration and improved rate capacity. Preferably, also the cycle stability and the C-rate capacity behavior are improved, or they are at least identical although the Li content is lower.

Batteries according to the invention may comprise two or more electrochemical cells that combined with one another, for example can be connected in series or connected in parallel. Connection in series is preferred. In batteries according to the present invention, at least one of the electrochemical cells contains at least one cathode according to the invention. Preferably, in electrochemical cells according to the present invention, the majority of the electrochemical cells contain a cathode according to the present invention. Even more preferably, in batteries according to the present invention all the electrochemical cells contain cathodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are, for example, computers, especially laptops, telephones or electric hand tools, for example in the building sector, especially drills, battery-powered screwdrivers or battery-powered staplers.

EXAMPLES

General remarks: % refer to % by weight unless expressly noted otherwise.

NL: liters under normal conditions (ambient temperature/1 bar).

Determination of S Content by Elemental Analysis:

A defined amount of the respective sample in the range of from 1 to 5 mg was placed into a capsule from Zn and combusted in a flow of helium/oxygen. The combustion temperature was about 1030° C. The gas so formed were converted catalytically into defined species, dried over $P_2O_5$ and separated chromatographically. The respective catalyst was Cu and $WO_3$ on $Al_2O_3$. Sulfur was detected as $SO_2$ by heat conductivity measurements.

The Ti content was measured by optical emission spectrometry with inductively coupled plasma (ICP-OES), Varian 720-ES, wavelength: 334.941 nm.

I. Syntheses of Cathode Active Materials

I.1 Synthesis of Compound (I.1)

| | |
|---|---|
| 70.7 g | LiOH (2.95 mol) (calculated without water) |
| 280.8 g | α-FeOOH (3.16 mol) calculated as FeOOH, containing 0.29 wt % S and 0.16 wt % Ti |
| 185.6 g | by weight aqueous solution of $H_3PO_4$ (1.61 mol) |
| 134.2 g | $H_3PO_3$ (98%) |
| 46.6 g | starch |
| 46.6 g | lactose |

A 6-l-reactor equipped with mixer and heater was charged with 4,600 g of $H_2O$. The water was heated to temperature of 76° C. Then addition of the ingredients was started. First, the LiOH was added and dissolved within 20 min. Due to exothermic reaction the solution temperature rose to 80.5° C. Then, the α-FeOOH was added and stirred for another 20 min. Then, $H_3PO_4$ and $H_3PO_3$ were added. 20 minutes later, starch and lactose were added in powder form. The temperature of the yellow slurry so obtained was 87° C. Then, 500 g of $H_2O$ were added. The slurry so obtained was stirred for 21 hours at 85° C.

Then, the solid was isolated by spray-drying. The slurry prepared in the above step was spray-dried using $N_2$ (25 $Nm^3/h$) as the drying gas, applying the following spray-drying parameters:

$T_{in}$ 295° C.-298° C.
$T_{out}$ 135° C.-143° C.
Slurry feed: 724.1 g/h

After spray-drying, 125 g of a yellow spray-powder were obtained.

60 g of the spray-powder obtained above were calcined in a rotary quartz-bulb. The rotary bulb was rotating with a speed of 10 rpm. The spray-powder sample was heated from ambient temperature to a temperature of 700° C., with a heating rate of 11.33° C./min. Finally, the material was calcined at a temperature of 700° C. for 1 hour under a stream of $N_2$ flow (16 NL/h). Then, the black material (compound (I.1)) so obtained was cooled down to room temperature. Compound (I.1) of stoichiometry C-containing $LiFePO_4 \cdot 0.01Fe_3(PO_4)_2$ ("CAM.1") was sieved to <50 μm. It contained about 3.6% by weight of carbon. The content of S was 0.08 wt % and the content of Ti was 0.11 wt %.

Production of Full Cells:

To produce a cathode (A.1), the following ingredients are blended with one another:

93 g of CAM.1

3 g polyvinylidene difluoride, (c.1) ("PVdF"), commercially available as Kynar Flex® 2801 from Arkema Group, 2.5 g carbon black, (b.1), BET surface area of 62 $m^2/g$, commercially available as "Super C 65L" from Timcal, 1.5 g graphite, (b.2), commercially available as KS6 from Timcal.

While stirring, a sufficient amount of N-methylpyrrolidone (NMP) was added and the mixture was stirred with an Ultraturrax until a stiff, lump-free paste had been obtained.

Cathodes are prepared as follows: On a 30 μm thick aluminum foil the paste is applied with a 15 μm doctor blade. The loading after drying is 2.0 mAh/$cm^2$. The loaded foil is dried for 16 hours in a vacuum oven at 105° C. After cooling to room temperature in a hood, disc-shaped cathodes are punched out of the foil. The cathode discs are then weighed and introduced into an argon glove box where they are again vacuum-dried. Then, cells with the prepared discs are assembled.

Electrochemical testing was conducted in "TC2" coin type cells. The electrolyte (C.1) used was a 1 M solution of $LiPF_6$ in ethyl methyl carbonate/ethylene carbonate (volume ratio 1:1).

Separator (D.1): glass fiber. Anode (B.1): graphite. Potential range of the cell: 2.50 V to 4.0 V.

Inventive electrochemical cell (BAT.1) was obtained.

II.2 Manufacture of Cathodes and Electrochemical Cells According to the Invention, and of Comparative Cathodes and Electrochemical Cells For comparative purposes, the above experiment was repeated but inventive (CAM.1) was replaced by an equal amount of C-CAM.2. Comparative electrochemical cell C-(BAT.2) was obtained.

III. Testing of Batteries

Electrochemical cells according to the invention and comparative electrochemical cells are each subjected to the following cycling program: Potential range of the cell: 2.50 V to 4.0 V., 0.1 C (first cycle), 0.2 C (from $2^{nd}$ to $7^{th}$ cycle). 1 C=160 mA/g. Temperature: 45° C., ambient temperature, and −25° C.

Electrochemical cells according to the invention show an overall very good or better performance compared to comparative electrochemical cells.

The electric conductivity can be determined as follows:

Disc-shaped pellets with a diameter of 0.8 cm and a height between 7 mm (at 100 bar) and 1 to 2 mm (at 500 bar) were formed from (CAM.1). The electric conductivity was measured in accordance with B. J. Ingram et al., J. Electrochem. Soc. 2003, 150, E396.

As a comparison, disc-shaped pellets with a diameter of 1.4 cm and a height of 6 mm were formed from C-(CAM.2) and tested under the same conditions.

The electric conductivities were determined at different pressures. The results were as follows, see table 1.

TABLE 1

Results of Conductivity Measurements

| Pressure (bar) | Conductivity (CAM.1) [$10^{-4}$ S/cm] | Conductivity C-(CAM.2) [$10^{-4}$ S/cm] |
|---|---|---|
| 100 | 8.74 | 0.37 |
| 200 | 14.0 | 0.56 |
| 300 | 18.2 | 0.70 |
| 400 | 21.5 | 0.81 |
| 500 | 23.8 | 0.90 |

The invention claimed is:

1. An electrode material, comprising:
    (a) a cathode active material comprising
        (i) at least one compound of general formula (I):

$LiFe_{(1-y)}M^1_yPO_4$     (I), wherein:
        y ranges from zero to 0.4; and
        $M^1$ is at least one element selected from the group consisting of Co, Mn, Ni, V, Mg, Nd, Zn, and Y
        (ii) at least one further iron-phosphorous compound with a composition different from the compound of general formula (I), wherein the further iron-phosphorous compound is an iron phosphide or is selected from the group consisting of $Fe_3(PO_4)_2$ and $Fe_2P_2O_7$,
        (iii) from 0.05 to 0.25% by weight of sulfur, relative to (a), and (iv) from 0.003 to 0.5% by weight of Ti, relative to (a); and (b) carbon in electrically conductive modification.

2. The electrode material of according to claim 1, wherein a ratio of the carbon (b) to the cathode active material (a) ranges from 0.5 to 8% by weight, relative to (a).

3. The electrode material according to claim 1, having a surface (BET) ranging from from 5 to 35 m$^2$/g.

4. The electrode material according to claim 3, wherein the surface (BET) ranges from 10 to 15 m$^2$/g.

5. The electrode material according to claim 1, wherein the cathode active material (a) comprises from 0.1 to 2% by weight of at least one transition metal selected from the group consisting of Mo, Cr, and Ni.

6. The electrode material according to claim 1, wherein the further iron-phosphorous compound is selected from the group consisting of Fe$_3$(PO$_4$)$_2$ and Fe$_2$P$_2$O$_7$.

7. The electrode material of claim 1, wherein the further iron-phosphorous compound is an iron phosphide.

8. The electrode material according to claim 1, wherein the further iron-phosphorous compound is distributed unevenly within compound (a).

9. The electrode material according to claim 1, wherein (a) comprises zero to less than 1% by weight of lithiated nickel-cobalt-manganese oxides.

10. A cathode, comprising at least one electrode material according to claim 1 and at least one binder (c).

11. An electrochemical cell, comprising
(A) at least one cathode comprising:
  (a) a cathode active material (a) comprising
    (i) at least one compound of general formula (I):

$$\text{LiFe}_{(1-y)}\text{M}^1_y\text{PO}_4 \qquad (I)$$

wherein:
      y ranges from zero to 0.4; and
      M$^1$ is at least one element selected from the group consisting of Co, Mn, Ni, V, Mg, Nd, Zn, and Y
    (ii) at least one further iron-phosphorous compound with a composition different from compound of general formula (I), wherein the further iron-phosphorous compound is an iron phosphide or is selected from the group consisting of Fe$_3$(PO$_4$)$_2$ and Fe$_2$P$_2$O$_7$,
    (iii) from 0.05 to 0.25% by weight of sulfur, relative to (a), and
    (iv) from 0.003 to 0.5% by weight of Ti, relative to (a);
  (b) carbon; and
  (c) a binder;
(B) at least one anode, and
(C) at least one electrolyte.

12. An article comprising the electrochemical cell according to claim 11, wherein the article is selected from the group consisting of an e-bike battery, an e-bus, a scooter, an HEV, a stationary application, an energy storage system backup power system, a marine application, a telecommunication device and a power tool.

\* \* \* \* \*

UNITED STATES PATENT AND TRADEMARK OFFICE
CERTIFICATE OF CORRECTION

| | |
|---|---|
| PATENT NO. | : 10,283,761 B2 |
| APPLICATION NO. | : 15/524400 |
| DATED | : May 7, 2019 |
| INVENTOR(S) | : Ivana Krkljus et al. |

It is certified that error appears in the above-identified patent and that said Letters Patent is hereby corrected as shown below:

In the Specification

In Column 4, Line 62, delete "sontent." and insert -- content. --.

In the Claims

In Column 11, Line 4, Claim 2, after "material" delete "of";
       Line 9, Claim 3, delete "from from" and insert -- from --, therefor.

Signed and Sealed this
Twenty-eighth Day of April, 2020

Andrei Iancu
*Director of the United States Patent and Trademark Office*